May 25, 1926.

I. M. PEASE

ANKLE SUPPORT

Filed July 11, 1923

1,585,938

2 Sheets-Sheet 1

I. M. Pease, Inventor

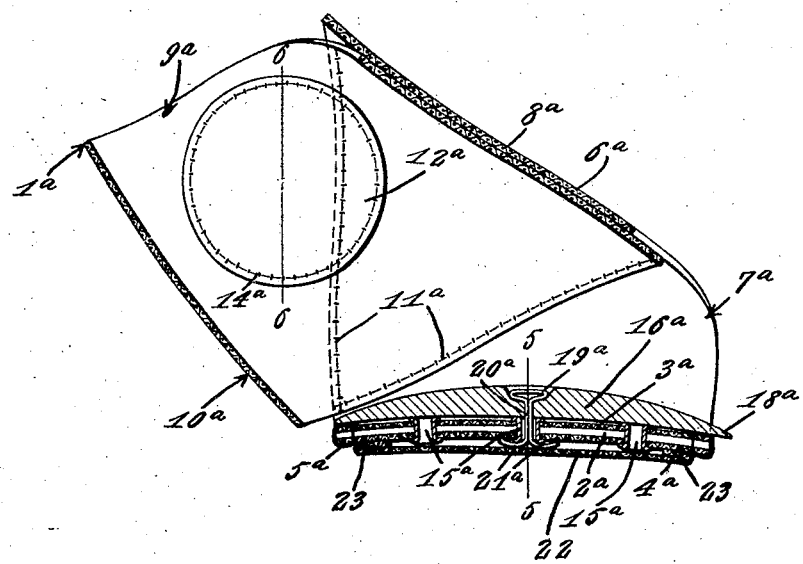
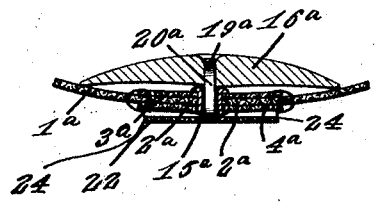
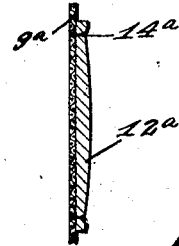

Patented May 25, 1926.

1,585,938

UNITED STATES PATENT OFFICE.

ISAAC M. PEASE, OF CINCINNATI, OHIO.

ANKLE SUPPORT.

Application filed July 11, 1923. Serial No. 650,919.

The device forming the subject matter of this application is an ankle support and the invention aims to provide novel means for fashioning the foot socket and the ankle brace. Another object of the invention is to provide novel means for mounting the pads in place.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that, within the scope of what is claimed changes in the precise embodiment of the invention shown can be made without departing from the spirit of the invention.

Figure 1:
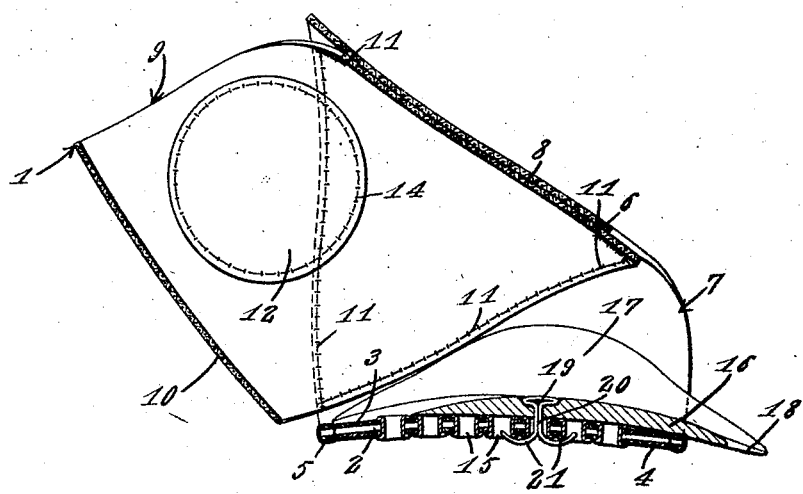
Figure 2:
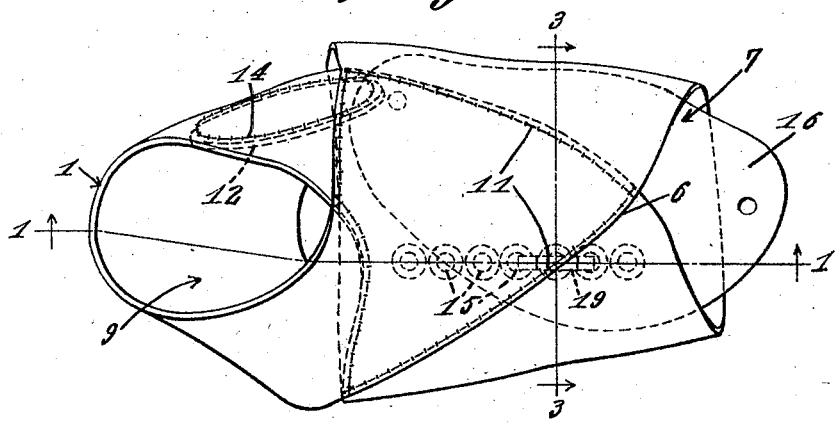
Figure 3:
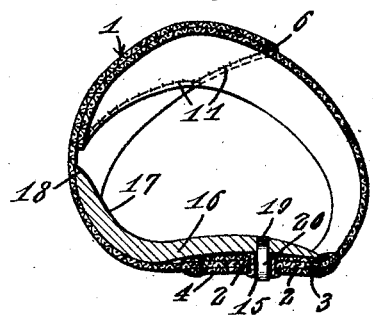

In the accompanying drawings:

Figure 1 shows in vertical longitudinal section, a device constructed in accordance with the invention; Figure 2 is a top plan, the line 1—1 in Figure 2 indicating the plane on which Figure 1 is taken; Figure 3 is a cross section on the line 3—3 of Figure 2; Figure 4 is a vertical longitudinal section showing a modified form of the invention; Figure 5 is a section on the line 5—5 of Figure 4; Figure 6 is a section on the line 6—6 of Figure 4.

In carrying out the invention there is provided an elastic band 1, the ends 2 of which are located between strips 3 and 4 made of cloth or any other suitable material, the strips 3 and 4 being stitched together about their periphery, through the ends 2 of the band 1. The loop thus formed is crossed upon itself, as at 6, to form a tubular socket 7, adapted to receive the foot of the wearer, and to form a tubular support 9 adapted to receive the ankle of the wearer, the support 9 being tapered from its forward end toward its rear or upper end, as indicated at 10, the socket 10 being tapered from its forward toward its rear end, as indicated at 8. Where the band 1 is crossed on itself, at the top of the socket 7, the constituent parts of the band are united by lines of stitching, shown at 11. A side pad 12 is located within the ankle support 9 and is held thereon by one of the lines 11 of stitching. An additional stitching, marked by the numeral 14 engages the side pad 12 and the walls of the ankle support 9 and the foot socket 7, unusual strength thus being afforded, owing to the provision of the stitchings shown at 11 and 14 in Figure 1. Eyelets 15, made of metal or any other suitable substance are mounted in the strips 3 and 4.

The numeral 16 marks a pad, made of rubber or other suitable material, the pad being located in the foot socket 7 on the bottom thereof, and including an upstanding wing 17 extended along one side of the socket. The pad 16 is thinned toward its edges, as marked by the numeral 18. A fastener is provided, the same including a head 19, a shank 20 and bendable prongs 21. The shank 20 of the fastener extends downwardly through the pad 16, the head 19 of the fastener being embedded in the pad. The shank 20 of the fastener may be mounted, for adjustment in any of the eyelets 15, and the prongs 21 of the fastener are bent upwardly and housed within certain of the eyelets 15, as clearly shown in Figure 1 of the drawings.

In the modification disclosed in Figures 4, 5 and 6, parts hereinbefore described have been designated by numerals previously used, with the suffix "a". In this form of the invention, the pad 16ª has no side wing, like the part 17 of Figure 3. The prongs 21ª are bent against the lower surface of a strip 3ª and are housed above a flexible member 22, the ends of which are secured, as at 23 to the strip 3ª, the longitudinal edges 24 of the member 22 being free, so that the member 22 may be pushed to one side, thereby giving access to the prongs 21 when an adjustment of the pad 16ª is desired, it being possible to mount the shank 20 of the fastener in any of the eyelets 15ª, to secure such adjustment.

What is claimed is:

A device of the class described, comprising a band, crossed upon itself and secured at its point of crossing to form a foot socket and an ankle support, the bottom portion of the foot socket being provided with spaced openings, a pad within the foot socket and located on the bottom portion of the foot socket, and a fastener mounted on the pad and adapted to be mounted in any of the openings, and a flexible guard extended across the lower end of the fastener, the guard being secured at its ends to the socket, and the sides of the guard being free, to give access to the lower end of the fasteners.

In testimony that I claim the foregoing as my own, I have hereto affixed my signature.

ISAAC M. PEASE.